United States Patent [19]

Powaska

[11] 3,994,369
[45] Nov. 30, 1976

[54] EMERGENCY VEHICLE BRAKE

[75] Inventor: Tadeusz Powaska, Bronx, N.Y.

[73] Assignee: Lawrence Peska Associates, Inc., New York, N.Y. ; a part interest

[22] Filed: May 8, 1975

[21] Appl. No.: 575,645

[52] U.S. Cl. ................................................ 188/5
[51] Int. Cl.² ......................................... B60T 1/14
[58] Field of Search ................ 188/5, 32; 187/8.71, 187/18; 254/10 C, 122; 74/520, 521

[56] References Cited
UNITED STATES PATENTS

| 1,079,316 | 11/1913 | Page | 187/8.71 |
|---|---|---|---|
| 1,311,998 | 8/1919 | Rogers | 188/5 |
| 2,703,632 | 3/1955 | Gambardella | 188/5 |
| 2,871,986 | 2/1959 | Polovitch | 188/5 |
| 3,454,174 | 7/1969 | Nelson | 254/122 |
| 3,823,915 | 7/1974 | Koehler | 254/122 |

FOREIGN PATENTS OR APPLICATIONS 626,314   9/1927   France ..................... 188/5

Primary Examiner—Trygve M. Blix
Assistant Examiner—Edward R. Kazenske
Attorney, Agent, or Firm—Jack D. Slobod

[57] ABSTRACT

A braking pad for a vehicle which is generally planar and which is urged downwardly against the pavement independently of the wheels. The linkage joining the pad and the vehicle insure the proper alignment of the pavement and the pad by the use of arms carried at one end for pivotal motion and at the other end for horizontal motion within a slot.

1 Claim, 4 Drawing Figures

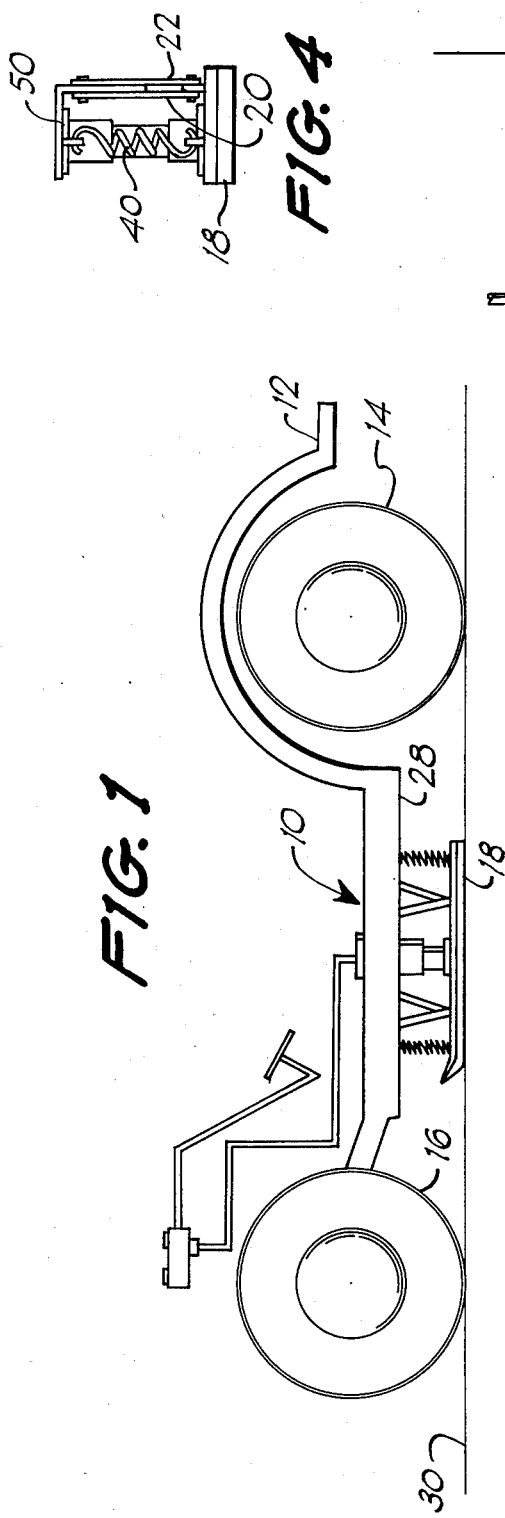
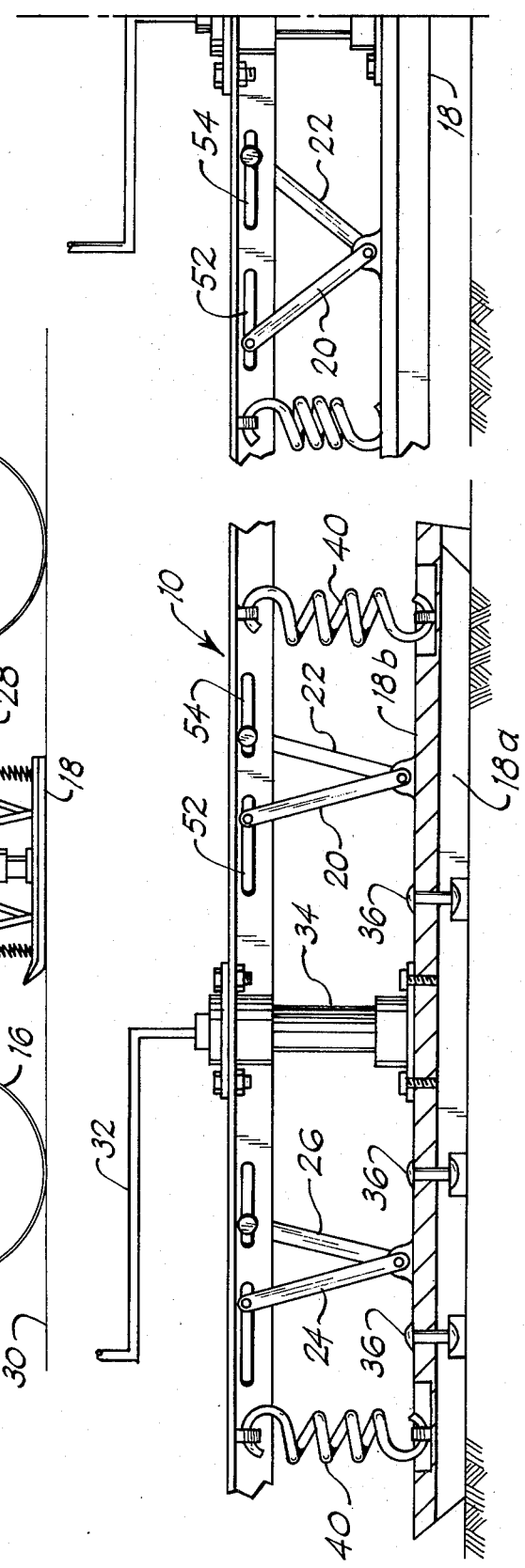

3,994,369

EMERGENCY VEHICLE BRAKE

BACKGROUND OF THE INVENTION

The invention relates to brakes for vehicles and particularly to brakes of the type which utilize a generally planar member which is urged downwardly against the pavement independently of any braking action which may occur at the vehicle wheels. The prior art includes various apparatus having a general similarity to the present invention. This includes the following U.S. Pat. Nos: Blain, 3,005,521; Jones, 3,554,328; Dowty, 2,877,969; Polovitch, 2,871,986; and Howells, et al, 3,799,293. Such apparatus has been primarily concerned with the actuating means for employing such braking systems. Relatively little consideration has been given to the means for carrying the pad in a manner which will insure that it impacts on the ground with the face thereof generally parallel to the pavement or ground. It will be apparent that with the use of a relatively large pad any variation in the angular position of the pad will cause substantial wear on a localized portion of the pad.

Accordingly it is a primary object of the invention to provide apparatus which is simple and inexpensive to manufacture and which will maintain the angular orientation of the pad with respect to the underside of the vehicle and the pavement and which is simple and inexpensive to manufacture.

SUMMARY OF THE INVENTION

It has now been found that these and other object of the invention may be attained by means of a generally planar horizontal pad which is carried on the underside of the vehicle. Means are provided for selectively moving the pad toward the pavement and for maintaining the pad in a generally horizontal position. The means comprises at least two pairs of arms carried between the pad and the vehicle. The arms have one end pivotally connected and the other end carried in a slot which is generally horizontal.

Normally the end of the arms carried on the vehicle is fixed in a slot and the other end is carried for pivotal motion about a point on the pad.

BRIEF DESCRIPTION OF THE DRAWING

The invention will be better understood by reference to the accompanying drawing, in which:

FIG. 1 is a simplified side elevational view of the apparatus in accordance with the invention, which includes a chassis and the braking mechanism;

FIG. 2 is a broken away side elevational view of a portion of the apparatus in FIG. 1 to a larger scale;

FIG. 3 is a view similar to that of FIG. 2 showing the retracted position of the pad in accordance with the invention; and FIG. 4 is a sectional view taken through a vertical plane at right angles to the drawing of FIG. 3.

DESCRIPTION OF THE PREFERRED EMBODIMENT

Referring now to FIGS. 1 through 3 there is shown braking apparatus 10 which is employed on an automobile chassis 12 having wheels 14, 16. It will be understood that braking apparatus 10 is used in conjunction with and synchronized with a conventional vehicle braking system, not shown, and may be activated by the brake pedal which activates the conventional braking system or/and independent mechanism. A pad 18 is selectively positioned in the position shown in FIG. 2 and also selectively positioned to the position shown in FIG. 3. It will be apparent that the arm 20, 22 and 24, 26 are pairs of arms which insure the movement of the pad 18 such that it is always parallel to the underside of the chassis 28. More particularly it will be apparent that the pad 18 always moves through a path where it will be parallel to the pavement 30 upon which the vehicle tires 14, 16 rest. Hydraulic pressure is selectively applied by conduit 32 to a hydraulic ram 34 which urges the shoe 18 downwardly. It will be understood that the shoe 18 includes not only a lining 18a but also a backup plate 18b. The backup plane 18b has rivets 36 extending therethrough to properly secure the lining 18a. Hydraulic pressure within the cylinder or ram 34 causes the tension springs 40 disposed at each end of the backup plate 18b to expand and limit motion. The arms 20, 22 it will be seen by comparison between FIGS. 2 and 3 to move in the slots 52, 54 of the channel 50 in a manner which maintains the horizontal alignment of the shoe 18 with the pavement. It will be seen that irregularity in the surface which the pad 18 engages in operation and slight misalignments of the skid pad 18 with the pavement or ground will cause inordinant wear of the pad 18. It will, therefore, be apparent that the provision of members 20, 22 moving in slots 52, 54 provide a very simple but effective method of insuring the horizontal alignment of pad 18 which is inexpensive to manufacture.

Having thus described my invention, I claim:

1. In a vehicle, a ground engaging brake apparatus comprising: a generally horizontal pad suspended from the underside of a vehicle chassis; a vertically extensible and retractible hydraulic ram coupled rigidly at an upper end to said chassis and coupled rigidly at a lower end to said pad for selectively vertically moving said pad between an upper position in which said pad is vertically spaced above the ground and a lower position in which said pad frictionally engages the ground and plural linkage means for maintaining said pad horizontal as said pad is moved between said upper and lower extreme positions, each of said linkage means comprising a pair of elongated arms pivotally connected at their lower ends to a common point on said pad and radiating generally upwardly in angularly spaced apart relationship respectively to a pair of spaced apart co-liner horizontally elongated slots in said chassis above said common point, and a pair of guide means respectively carried on the upper ends of said pair of bars which are respectively slideably received in said pair of slots.

* * * * *